United States Patent [19]

Srinivasan

[11] 4,347,747
[45] Sep. 7, 1982

[54] SINGLE PHASE FLOW MEASUREMENT
[75] Inventor: Krishnaswamy Srinivasan, Columbus, Ohio
[73] Assignee: Shell Oil Company, Houston, Tex.
[21] Appl. No.: 224,409
[22] Filed: Jan. 12, 1981
[51] Int. Cl.³ .................. G01F 1/20; E21B 47/00
[52] U.S. Cl. ....................... 73/861.18; 73/155; 73/861.42
[58] Field of Search .......... 73/861.04, 861.18, 861.21, 73/861.22, 861.32, 861.34, 861.42, 155; 340/611

[56] References Cited
U.S. PATENT DOCUMENTS 3,370,463  2/1968  Chanaud .................. 73/861.34
3,719,073  3/1973  Mahon .................... 73/861.22
3,834,227  9/1974  Patterson et al. ............. 73/155
4,183,243  1/1980  Patterson et al. ............. 73/155
4,300,399  11/1981 Kuijpers et al. ........... 73/861.04

Primary Examiner—Charles A. Ruehl

[57] ABSTRACT

A method and apparatus for measuring fluid flow by placing two pressure sensors diametrically opposite each other in a flow line. The use of two sensors effectively cancels acoustic pressure fluctuations while preserving the local turbulent pressure fluctuations. The turbulent pressure fluctuations are proportional to the square of the flow rate of the fluid and are processed by the electrical circuit to derive a quantity proportional to the fluid flow rate.

3 Claims, 2 Drawing Figures

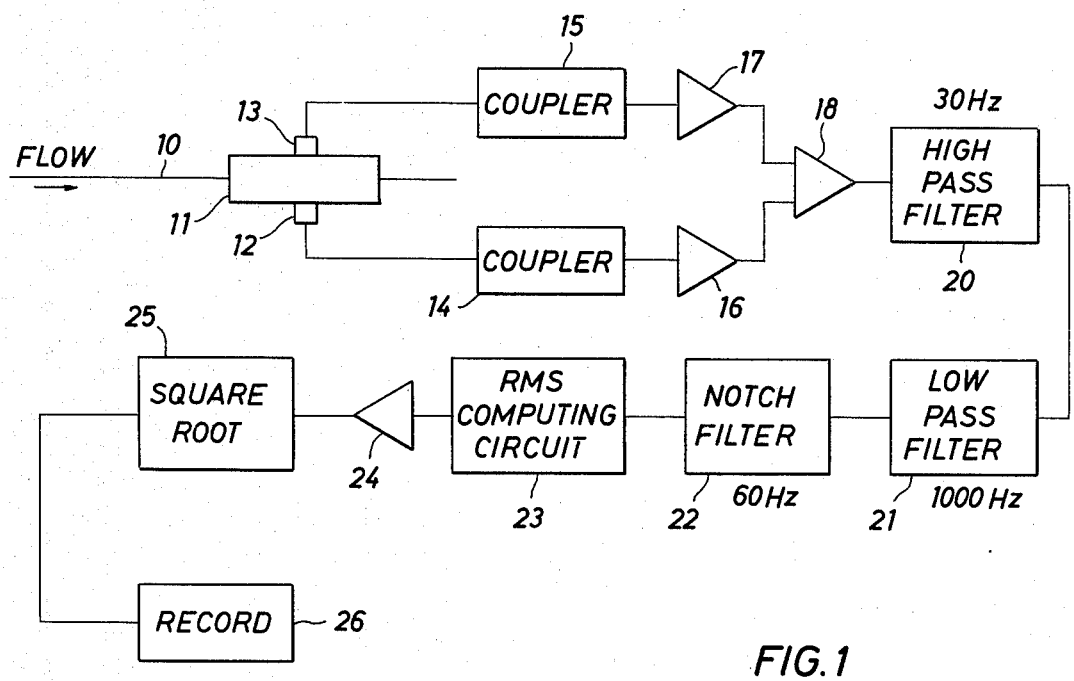
FIG. 1
FIG. 2
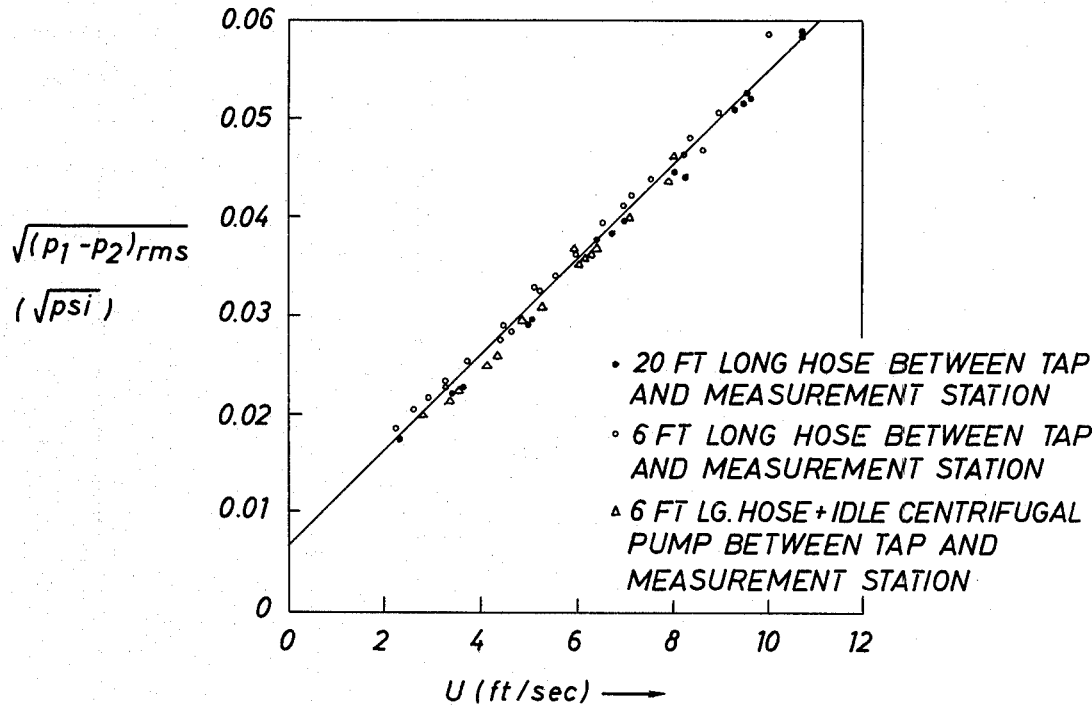

SINGLE PHASE FLOW MEASUREMENT

RELATED PATENTS

The present application is related to U.S. Pat. Nos. 3,834,227 and 4,183,243. This application is also related to a pending application Ser. No. 06/145,565 filed May 1, 1980 entitled "Measuring Two Phase Flow" by Kuijpers et al now U.S. Pat. No. 4,300,999.

BACKGROUND OF THE INVENTION

The present invention relates to a method and apparatus for determining the fluid flow velocity in a pipeline. In particular, the invention utilizes the technique of measuring the dynamic pressure fluctuations produced by turbulent flow to determine the flow rate. The above referenced patents disclose the use of a single pressure transducer to detect the dynamic pressure fluctuations caused by turbulent flow to determine the flow rate in the pipeline. The pending application discloses to use of two identical transducers which are mounted diametrically opposite to each other in the pipeline. Acoutic pressure fluctuations transmitted through the fluid are sensed identically by both transducers. The turbulent pressure fluctuations sensed by the two transducers are, however, independent of each other. Therefore, from the difference in the dynamic pressures measured by the two transducers, one can determine the flow rate in a single phase flow system.

All of the above methods have provided satisfactory results for measuring flow rates in pipelines where great accuracy is not required. The systems disclosed in the two patents have been used extensively to monitor the production from oil wells to determine when the production had fallen to a level that required remedial action or a workover of the well. While the systems are satisfactory, they did require that the flow measuring instruments be calibrated in place on the pipeline. The single transducer method works well for two phase flow but has the following disadvantage when used for single phase flow measurement. The instrument calibration depends strongly on flowline geometry, both near and far, and on acoustic pressure sources in the flowline. In practical oil field operations, variations in the flowline geometry and in acoustic pressure sources occur as valve positions are changed and pumps are turned on or off. Therefore, the measured flow rate signal displays considerable scatter even if the flow rate remains constant.

While these problems occur in two-phase flow systems as well, they are more acute for single-phase flow measurement. In these instances it was normally impossible to use the systems disclosed in the prior patents unless one was willing to accept rather large errors in the measured flow rate.

SUMMARY OF THE INVENTION

The present invention is based on the discovery that the inaccuracies in the measured flow rate using the system disclosed in the prior patents was the result of acoustic pressure fluctuations in the pipeline. Acoustic pressure fluctuations can be caused by a pump or an obstruction or any other source of turbulence in the pipeline. The acoustic pressure fluctuations are measured by the pressure transducers, in addition to the pressure fluctuations associated with the local turbulence. It is desired to measure only the latter component since it alone is related to the flow velocity in the manner specified by the prior patents. The acoustic pressure fluctuations cause errors in the measured flow rate. The influence of the acoustic pressure fluctuations can be removed from the measurement by utilizing two diametrically opposed transducers and taking the difference of their outputs. The acoustic pressure fluctuations will be in-phase and will cancel each other. In contrast, the pressure field produced by the local turbulent flow will not be in-phase on opposite sides of the pipeline and will not cancel each other. Further, the accuracy of the system has been improved by mounting the transducers so that their sensitive surface is flush with the wall of the pipeline. Thus, the transducers respond accurately to the pressure fluctuations in the pipeline and not to the pressure fluctuations transmitted by the pipe tap as in the former system. It has been shown that the pipe tap distorts the pressure signal transmitted. Finally, low frequency pressure signals were attenuated by high pass electrical filters since they reflected the effect of distant flowline geometry. The filtered signal is then dependent mainly on the local flowline geometry and the local flow velocity.

The remainder of the system is substantially the same as that disclosed in the prior art patent except that the system incorporates a filter for removing high frequencies and a notch filter to remove 60-cycle frequencies which may be present due to electrical interference.

BRIEF DESCRIPTION OF THE DRAWING

The invention will be more easily understood from the following detailed description when taken in conjunction with the attached drawings in which:

FIG. 1 is a block diagram of a preferred embodiment of the invention.

FIG. 2 is a plot of the actual flow rate versus the measured pressure fluctuations under a number of different conditions, during laboratory tests.

DESCRIPTION OF A PREFERRED EMBODIMENT

Referring now to FIG. 1, there is shown a pipeline 10 having a measuring section 11 in which the transducers 12 and 13 are mounted. While the section 11 is shown enlarged for convenience, in actual practice it would have the same inner diameter as the pipeline. Provisions should be made so that the transducers 12 and 13 are mounted with their sensitive surfaces flush with the inner wall of the pipeline. The two transducers are coupled by means of charge couplers 14 and 15 and amplifiers 16 and 17 to a differential amplifier 18. The combination of the coupler and the preamplifiers performs the functions of impedance conversion and signal amplification. The transducers are preferably piezoelectric transducers which produce an electrical output signal related to the pressure fluctuations in the fluid adjacent to the sensitive surface of the transducer.

The differential amplifier 18 will supply an output signal which is the difference between the two transducers signals. As explained, the acoustic pressure fluctuations will be in-phase at the two transducers while the pressure fluctuations resulting from the local turbulent flow in the pipeline will be out-of-phase. Thus, the output signal of the differential amplifier 18 will depend only on the pressure fluctuations resulting from turbulent flow while the acoustic pressure fluctuations will be eliminated. The amplified signal passes through a high pass filter 20 with a cutoff frequency of 30 Hz and then through a low pass filter 21 with a cutoff frequency of 1000 Hz. The high pass filter attenuates the low frequency components in the measured signal which are associated with eddies of larger wavelength. These eddies reflect the effect of distant flowline geometry. The low pass filter cutoff of 1000 Hz is set high enough to let the signals of interest pass unattenuated. The signal is further filtered by a notch filter 22 which attenuates the 60-cycle frequency component of the signal. Electrical oilfield equipment causes this interference and it is desirable to selectively remove this component. The signals then pass through a root means square (RMS) computing circuit 23 where the RMS of the signal is obtained. This signal is then passed to a preamplifier 24 whose signal is passed to a square root circuit 25 and then recorded by recorder 26. The majority of the above electronics are shown and described in the above referenced patents and further description is believed unnecessary.

FIG. 2 shows the results of three separate tests of the system under three different operating conditions and a variety of flow rates. The tests involved the measurement of tap water flow rates in an open loop flow circuit. The distant flowline geometry was different for the three cases as indicated on the figure, whereas the local flowline geometry remained the same. In particular, there is shown the result for a 20-foot long hose between the water tap and measuring station, a 6-foot hose between the water tap and a measuring system and a 6-foot hose plus an idle centrifugal pump between the tap and the measuring station. The idle centrifugal pump represents a source of turbulence distant from the measurement location. The actual flow rate is plotted on the horizontal axis while the vertical axis provides the output of the circuit of FIG. 1, converted to pressure units. As is seen from the data in FIG. 2, the present invention provides a substantially linear and repeatable response between measured signal and the fluid flow rate despite variations in the distant flowline geometry. The output of the single transducer for the same flow situations had much higher scatter and was far less repeatable. The zero offset corresponding to the zero flow rate is dependent only on the electrical noise level of the pressure transducers themselves and can be compensated for in actual systems. Further, the offset, once determined, will remain constant.

From the above description, it can be seen that the invention has provided a simple method and apparatus by which a linear and repeatable response may be obtained between the measuring circuit output and the actual flow rate. The measured pressure fluctuations depend only on the local flowline geometry and on the local flow velocity, which is a great advantage. The calibration factor for the device therefore does not change with changes in the distant flowline geometry or in the acoustic pressure fluctuations in the flowline. Further, the error in the computed flow rate after calibration will be less than 10%, using the present invention. The only requirement of the invention is that the two pressure transducers be closely matched and disposed with their sensitive axes flush with the inner surface of the pipeline. In particular, the pressure transducers described in the above referenced patents can be used with the present invention without modification provided their responses are substantially the same. Similarly, the bulk of the measuring circuit of the prior patents can also be used. Only the differential amplifier must be inclined to compute the different of the two measured pressure signals.

What is claimed is:

1. A method for measuring single phase fluid flow rate in a pipe comprising:
   measuring the fluid pressure fluctuations in the pipe at two diametrically opposite positions;
   taking the different of said measured pressure fluctuations;
   electronically filtering said different to pass only signals above 30 Hz and below 1000 Hz;
   taking the RMS value of the filtered difference in said measured pressure fluctuations; and,
   taking the square root of the RMS signal, said square root being proportional to the fluid flow rate.

2. An apparatus for measuring fluid flow in a pipe comprising:
   two pressure transducers, said transducers being mounted on said pipe with their sensitive surfaces flush with the inner surface of the pipe;
   differential amplifier means, said transducers being coupled to said differential amplifier means to obtain a difference signal;
   filter means, said filter means being coupled to said differential amplifier means to attenuate frequencies below 30 Hz and above 1000 Hz;
   RMS circuit means coupled to said filter means for obtaining the RMS value of the different signal; and,
   a square root circuit, said RMS circuit means being coupled to said square root circuit means to obtain the square root of the RMS signal.

3. The apparatus of claim 2 and in addition a notch filter for removing 60 Hz signals from said different signal.

* * * * *